(12) United States Patent
Feyereisen et al.

(10) Patent No.: US 10,957,207 B2
(45) Date of Patent: Mar. 23, 2021

(54) SYSTEMS AND METHODS FOR ASSOCIATING CRITICAL FLIGHT REFERENCE DATA WITH A FLIGHT PATH VECTOR SYMBOL

(71) Applicant: HONEYWELL INTERNATIONAL INC., Morris Plains, NJ (US)

(72) Inventors: Thea L. Feyereisen, Hudson, WI (US); Gang He, Morristown, NJ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 198 days.

(21) Appl. No.: 16/143,789

(22) Filed: Sep. 27, 2018

(65) Prior Publication Data
US 2020/0105145 A1  Apr. 2, 2020

(51) Int. Cl.
*G07C 1/10* (2006.01)
*G08G 5/00* (2006.01)
*B64D 43/02* (2006.01)
*G07C 5/00* (2006.01)

(52) U.S. Cl.
CPC ......... *G08G 5/0021* (2013.01); *B64D 43/02* (2013.01); *G07C 5/008* (2013.01); *G08G 5/0039* (2013.01); *G08G 5/0078* (2013.01)

(58) Field of Classification Search
CPC .. G08G 5/0021; G08G 5/0039; G08G 5/0078; B64D 43/02; G07C 5/008
USPC ........................................................ 701/120
See application file for complete search history.

(56) References Cited

U.S. PATENT DOCUMENTS

| | | | |
|---|---|---|---|
| 6,028,536 A | 2/2000 | Voulgaris | |
| 6,970,107 B2 | 11/2005 | Gannett | |
| 7,295,901 B1* | 11/2007 | Little | G01C 23/005 342/33 |
| 2005/0200502 A1* | 9/2005 | Reusser | G01C 23/00 340/973 |
| 2009/0248297 A1 | 10/2009 | Feyereisen et al. | |
| 2011/0025530 A1* | 2/2011 | He | G08G 5/025 340/972 |

(Continued)

FOREIGN PATENT DOCUMENTS

EP    2107340 A2    10/2009

OTHER PUBLICATIONS

Weinstein, L.F., et al.; Standardization of Aircraft Control and Performance Symbology on the USAF Head-Up Display; Nov. 1993.

*Primary Examiner* — James M McPherson
*Assistant Examiner* — Tiffany P Ohman
(74) *Attorney, Agent, or Firm* — Lorenz & Kopf, LLP

(57) ABSTRACT

Systems and methods for associating critical flight reference data with a flight path vector symbol are provided. The system displays a continuously updated image with a symbol for a flight path vector. The system displays a first readout arrangement, in which the airspeed indicator and the altitude indicator are (i) each located in relationship to boundary edges of the display device, and (ii) their locations are substantially static. The system detects a deviation between the flight path vector and the heading, and when the deviation exceeds a threshold, the system toggles to a second readout arrangement, in which the airspeed indicator and the altitude indicator are (i) each located a distance measured from the flight path vector, and (ii) dynamically change location responsive to movement of the flight path vector.

20 Claims, 5 Drawing Sheets

(56) References Cited

U.S. PATENT DOCUMENTS

2012/0299753 A1 11/2012 Thoreen
2015/0261379 A1 9/2015 Kneuper et al.

* cited by examiner

SYSTEMS AND METHODS FOR ASSOCIATING CRITICAL FLIGHT REFERENCE DATA WITH A FLIGHT PATH VECTOR SYMBOL

TECHNICAL FIELD

The technical field generally relates to aircraft display systems, and more particularly relates to the display of critical flight reference data on a primary flight display.

BACKGROUND

A Head Up Display (HUD) is a type of see-through display on which data and information is projected over a view of "the real world," or external scene. Due to the potential of obscuring objects in the external scene, there is pressure to utilize the area of the HUD judiciously. Of particular concern is the technical problem of displaying critical flight reference information in a most useful and intuitive manner on available area on the HUD. For example, a HUD can be quite large in the scene of large field of view, and it can impose a mental and physical cost to the pilot to perform a complete scan across the display to retrieve relevant critical flight reference data like altitude and airspeed.

In addition to difficulties presented by the size of the HUD, in some critical scenarios, a pilot's area of focus may be especially narrow. In these scenarios, the pilot's area of focus is typically centered around the symbol for the flight path vector. Non-limiting examples of these critical scenarios include critical phases of flight, like landing and takeoff, and high workload flight events, like wind shear and Enhanced Ground Proximity Warning System (EGPWS) recovery. During these scenarios, displayed critical flight reference data, such as airspeed and altitude, can fall out of the pilot's area of focus, which may degrade situation awareness, and potentially increase a chance of a flight technical error.

Therefore, as the display of information and HUD technology progresses, presenting critical flight reference information in a most useful and intuitive manner on the HUD is an ongoing technical problem. Accordingly, improved systems and methods for presenting critical flight reference information to pilots in the most critical scenarios are desired. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight display system for an aircraft is provided. The flight display system includes: a source of real-time aircraft status data; a source of data representing a trajectory of travel; a display system configured to process the aircraft status data and prescribed trajectory of travel to display on a display device a continuously updated image with a flight path vector; and a computer system configured to receive and process aircraft status data and the data representing the prescribed trajectory of travel to: (a) command the display system to overlay a first readout arrangement, in which an airspeed indicator and an altitude indicator are (i) each located in relationship to boundary edges of the display device, and (ii) their locations are substantially static; (b) determine whether a deviation between a heading of the aircraft and the flight path vector is greater than or equal to a threshold; and command the display system to modify the first readout arrangement to a second readout arrangement, in which the airspeed indicator and the altitude indicator are (i) each located a distance measured from the flight path vector, and (ii) dynamically change location responsive to movement of the flight path vector, upon determining that the deviation between the heading of the aircraft and direction of travel represented by flight path symbol is greater than or equal to the threshold.

Also provided is a processor implemented method for a flight display system for an aircraft. The method includes: receiving real-time aircraft status data; receiving data representing a prescribed trajectory of travel; processing the aircraft status data and the data representing the prescribed trajectory of travel to display on a display device a continuously updated image with a flight path vector depicting an axis of the aircraft at a current location of the aircraft; commanding the display system to overlay a first readout arrangement, in which an airspeed indicator and an altitude indicator are (i) each located in relationship to boundary edges of the display device, and (ii) their locations are substantially static; determining whether a deviation between a heading of the aircraft and the flight path symbol is greater than or equal to a threshold; and commanding the display system to modify the first readout arrangement to a second readout arrangement, in which in which the airspeed indicator and the altitude indicator are (i) each located a distance measured from the flight path vector, and (ii) dynamically change location responsive to movement of the flight path vector.

In addition, an aircraft is provided. The aircraft, including: a source of real-time aircraft status data; a source of data representing a prescribed trajectory of travel; a display system configured to receive and process the aircraft status data and the data representing the prescribed trajectory of travel to display a continuously updated image with a symbol for a flight path vector depicting an axis of the aircraft at a current location of the aircraft; and a computer system coupled to the display system and configured to receive and process aircraft status data and the data representing the prescribed trajectory of travel to: (a) command the display system to overlay a first readout arrangement, in which an airspeed indicator and an altitude indicator are each substantially static; (b) determine whether a deviation between a heading of the aircraft and the flight path vector is greater than or equal to a threshold; and command the display system to modify the first readout arrangement to a second readout arrangement, in which the airspeed indicator and the altitude indicator are (i) each located a distance measured from the flight path vector, and (ii) dynamically change location responsive to movement of the flight path vector, when the deviation between the heading of the aircraft and the flight path symbol is greater than or equal to the threshold.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, HUDs present a distinct technical problem of balancing a minimal amount of interference with an external scene while presenting relevant and critical information to a user in the most beneficial way. Various approaches have tried declutter options, but these sometimes remove some of the critical flight information. In other approaches, analog indicators are rendered in fixed locations that are at peripheries of a HUD image area; these are difficult to easily scan, especially in crosswind scenarios. Exemplary embodiments of the novel system for associating critical primary flight reference data with a flight path vector (FIG. 1, 102) provide a technical solution to this technical problem. Exemplary embodiments of the novel disclosed system go back and forth between a static display of critical primary flight reference data and one that dynamically associates critical primary flight reference data with a flight path vector, responsive to a configurable trigger. The occurrence and non-occurrence of the trigger toggles the arrangement of critical flight reference data between a static readout arrangement and a dynamic readout arrangement. A deviation threshold, measured as a distance between the flight path vector (FIG. 2, 214) and the heading (indicated by a watermark (FIG. 2, 212), is the trigger. The figures and descriptions below provide more detail.

Figure 1:
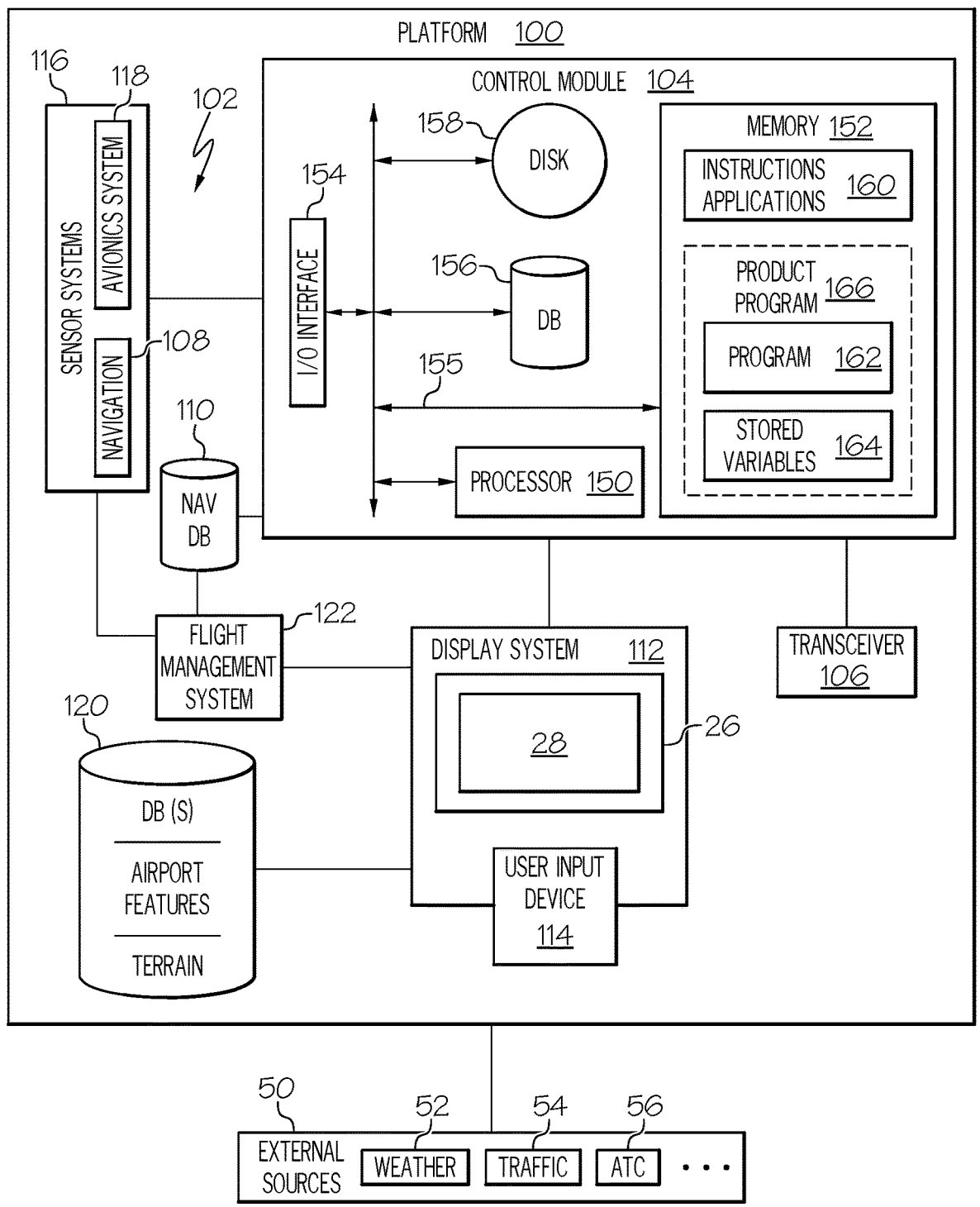
FIG. 1 is a block diagram of a system for associating critical flight reference data with a flight path vector symbol, in accordance with an exemplary embodiment.

Turning now to FIG. 1, in an embodiment, the system for associating critical primary flight reference data with a flight path vector 102 (also referred to herein as "system" 102) is generally located in a mobile platform 100. In various embodiments, the mobile platform 100 is an aircraft, and is referred to as aircraft 100. The system 102 embodies a control module 104. In some embodiments, the control module 104 may be integrated within a preexisting mobile platform management system, avionics system, cockpit display system (CDS), flight controls system (FCS), or aircraft flight management system (FMS 122). Although the control module 104 is shown as an independent functional block, onboard the aircraft 100, optionally, it may exist in an optional electronic flight bag (EFB). In embodiments in which the control module is within an EFB, the display system 112 and user input device 114 may also be part of the EFB. Further, in some embodiments, the control module 104 may reside in a portable electronic device (PED) such as a tablet, cellular phone, or the like.

The control module 104 performs the processing functions of the system 102. To perform these functions, the control module 104 may be operatively coupled to any combination of the following aircraft systems: a source of real-time aircraft status data, such as a navigation system 108; a source of a prescribed trajectory of travel providing data representing a trajectory of travel; and, a display system 112. In various embodiments, the control module 104 is additionally operationally coupled to one or more of: a transceiver 106; a user input device 114; one or more databases 120; a flight management system (FMS 122); and one or more avionics systems sensors 118. The functions of these aircraft systems, and their interaction, are described in more detail below.

The navigation system 108 is a type of sensor system within a sensor system functional block, (sensor system(s) 116). The navigation system 108 is configured to provide real-time navigation data and/or information regarding operation of the aircraft 100. As used herein, "real-time" is interchangeable with current and instantaneous. The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 122, as will be appreciated in the art. The data provided by the navigation system 108 is referred to as navigation data (also referred to herein as aircraft status data). Aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. The real-time aircraft status data, or navigation data, is made available such that the display system 112, the transceiver 106, and the control module 104, may further process and/or handle the aircraft status data.

The prescribed trajectory of travel may include a series of intended geospatial midpoints between a departure and an arrival, as well as performance data associated with each of the geospatial midpoints (the performance data including intended navigation data such as intended airspeed, intended altitude, intended acceleration, intended flight path angle, and the like). A source of data representing the prescribed trajectory of travel may be a storage location or a user input device. In various embodiments, the navigation database (NavDB 110) is the source of data representing the prescribed trajectory of travel. The NavDB 110 is a storage location that may also maintain a database of flight plans, and/or information regarding terrain and airports and/or other potential landing locations (or destinations) for the aircraft 100. In operation, the navigation system 108 and the NavDB 110 may be integrated with a FMS 122.

The avionics system(s) 118 is another type of sensor system within the sensor system(s) 116. In various embodiments, the avionics system(s) 118 provide aircraft performance data and feedback for subsystems on the aircraft 100.

Examples of the aircraft performance data include: engine thrust level, fuel level, braking status, temperature control system status, and the like. As may be appreciated, the avionics system(s) 118 may therefore include a variety of on-board detection sensors, and, as part of the sensor systems 116, may be operationally coupled to the FMS 122.

In various embodiments, the FMS 122, in cooperation with the sensor systems 116 and the NavDb 110, provides real-time flight guidance for aircraft 100. The FMS 122 is configured to compare the instantaneous position and heading of the aircraft 100 with a prescribed flight plan for the aircraft 100. To this end, in various embodiments, the NavDB 110 supports the FMS 122 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 122 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 122 may be a source for the real-time aircraft status data of the aircraft 100.

The display system 112 includes a display device 26 for presenting an image 28. The display system 112 is configured to continuously receive and process real-time aircraft status data and flight plan information. In various embodiments, the display system 112 formats and renders information received from the FMS 122, as well as external sources 50. In various embodiments, the display system 112 may directly receive input from an air data heading reference system (AHRS), an inertial reference system (IRS), the navigation system 108, or the FMS 122. The control module 104 and the display system 112 are cooperatively configured to generate the commands ("display commands") for the display device 26 to render thereon the image 28, comprising various graphical user interface elements, tables, menus, buttons, and pictorial images, as described herein. In exemplary embodiments, the display device 26 is realized in one or more electronic display devices configured as any combination of: Head Up Display (HUD), a Near to Eye (NTE) display, and a Helmet Mounted Display (HMD). The display device 26 is responsive to display commands from the control module 104 and/or display system 112.

Renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes, and for causing objects and symbols to fade-in and fade-out. As used herein, a fade-in and/or fade-out means changing between not being rendered at all (i.e., zero percent) and being fully rendered (i.e., 100%) in incremental steps. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 26, the graphical images associated with operation of the aircraft 100, and specifically, the graphical images as described herein.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

In various embodiments, any combination of the FMS 122, user input device 114, and transceiver 106, may be coupled to the display system 112 such that the display system 112 may additionally generate or render, on a display device 26, real-time information associated with respective aircraft 100 components. Coupled in this manner, the FMS 122 and transceiver 106 are configured to provide navigation information to support navigation, flight planning, and other aircraft control functions in a conventional manner, as well as to provide real-time data and/or information regarding the operational status of the aircraft 100 to the control module 104. In some embodiments, the user input device 114, FMS 122, and display system 112 are configured as a control display unit (CDU).

External sources 50 communicate with the aircraft 100, generally by way of transceiver 106. External sources include: weather and surface data sources (weather 52), such as a source for meteorological terminal aviation weather reports (METARS), automatic terminal information service (ATIS), datalink ATIS (D-ATIS), automatic surface observing system (ASOS); traffic data system(s) 54; air traffic control (ATC) 56; and a variety of other radio inputs. The traffic data system(s) 120 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification. Information received from external sources may be processed as one or more information layers (for example, a weather layer, a traffic layer, and the like) and layers may be selectively overlaid on an existing image 28.

The transceiver 106 is configured to support instantaneous (i.e., real time or current) communications between the aircraft 100 and the one or more external data source(s) 50. As a functional block, the transceiver 106 represents one or more transmitters, receivers, and the supporting communications hardware and software required for the system 102 to communicate with the various external data source(s) 50 as described herein. In an example, the transceiver 106 supports bidirectional pilot-to-ATC (air traffic control) communications via a datalink. In addition to supporting the data link system, the transceiver 106 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 50. In this regard, the transceiver 106 may allow the aircraft 100 to receive information that would otherwise be unavailable to the pilot and/or co-pilot using only the onboard systems.

In various embodiments, the control module 104 is additionally operationally coupled to one or more databases 120. The databases 120 may include an airport features database, having therein maps and geometries, as well as airport status data for the runways and/or taxi paths at the airport; the airport status data indicating operational status and directional information for the taxi paths (or portions thereof). Additionally, the databases 120 may include a terrain database, having therein topographical information for the airport and surrounding environment.

As mentioned, the control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may take many forms, such as a computer system, hardware, software, firmware, electronic control component, processing logic, and/or processor device, individually or in any combination. Therefore, depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 114. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, cause the control module 104 to perform the functions, techniques, and processing tasks associated with the operation of the system 102. Novel program 162 and associated stored variables 164 may be stored in a functional form on computer readable media, as depicted, in memory 152. While the depicted exemplary embodiment is described in the context of a fully functioning computer system, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, such as the method steps of method 500, the processor 150 specifically loads the instructions embodied in the program 162, thereby being programmed with program 162. During execution of program 162, the processor 150 and the memory 152 form a novel dynamic readouts processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the transceiver 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156.

In one embodiment, the I/O interface 154 is integrated with the transceiver 106, and obtains data from external data source(s) directly.

The database 156 may include an aircraft-specific parameters database (comprising aircraft-specific parameters and configuration data for aircraft 100, as well as for a variety of other aircrafts) and parameters and instructions for processing user inputs and rendering images 28 on the display device 26, as described herein. In some embodiments, the database 156 is part of the memory 152. In various embodiments, the database 156 and the database 120 are integrated, either within the control module 104 or external to it. Accordingly, in some embodiments, the airport features and terrain features are pre-loaded and internal to the control module 104. Another form of storage media that may be included in, and utilized by, the control module 104 is an optional hard disk 158.

Figure 2:
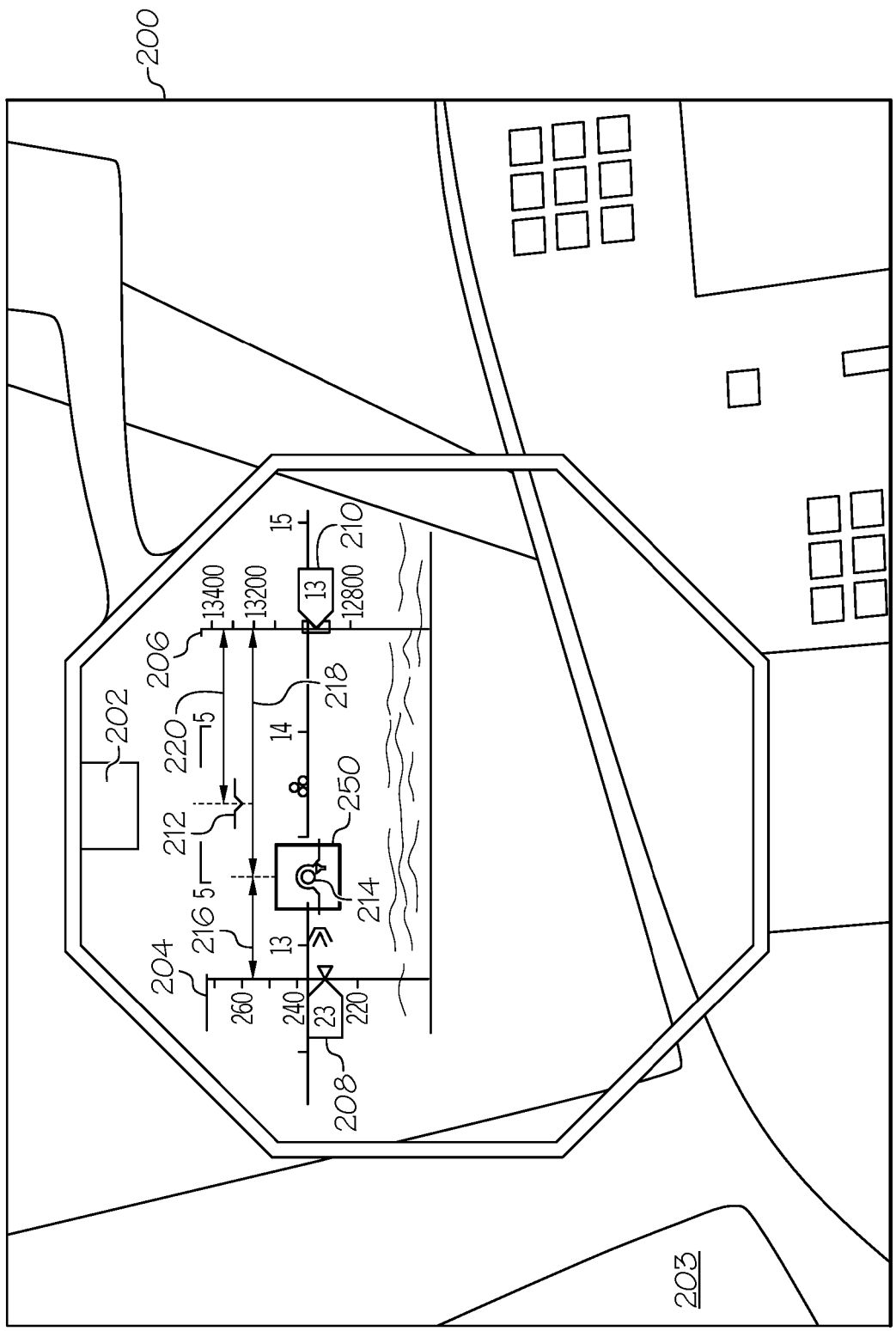
FIG. 2 is a prior art illustration showing critical flight reference data on a HUD.

To appreciate the enhancement provided by the system 102, we turn to FIG. 2 for a discussion of a HUD without system 102. Image 200 is a view from inside a cockpit of an aircraft. A head up display HUD 202 is shown in front of a cockpit window and oriented to provide readable navigational information to a viewer inside the cockpit. As described above, the navigational information is overlaid on the external scene 203 (i.e., "real world" environment outside of the cockpit). Critical flight reference data on the HUD 202 includes an analog speed indicator, in the form of analog speed tape 204 and an analog altitude indicator, in the form of analog altitude tape 206. The analog speed tape 204 and the analog altitude tape 206 are arranged vertically near the left boundary edge of the HUD 202 and near the right boundary edge of the HUD 202, respectively. A water line 212 represents a current heading of the aircraft 100. The analog speed tape 204 and the analog altitude tape 206 are each approximately equidistant from a centrally located water line 21. Viewing FIG. 2, a horizontal distance 220 places the water line 212 substantially half of the horizontal distance between the analog speed tape 204 and the analog altitude tape 206. In various embodiments, a digital speed readout 208 is overlaid and integrated with the analog speed tape 204 and a digital altitude tape 210 is overlaid and integrated with the analog altitude tape 206. As may be appreciated, in some embodiments, the analog speed indicator is in the form of a dial and the analog altitude indicator is in the form of a dial.

As mentioned, a focus area 250 for the eye moves with the flight path vector 214. This may be satisfactory in many scenarios. However, in scenarios in which the flight path vector 214 is substantially far from an indicator of critical flight reference data, this can be unsatisfactory, because at least some of the critical flight information on the image may be too far outside the focus area 250. As may be seen in FIG. 2, the flight path vector 214 is closer to the airspeed tape 204 and farther from the altitude tape 206. The flight path vector 214 is located distance 216 from the airspeed tape 204 and distance 218 from the altitude tape 206. Distance 216 is substantially shorter than distance 218. The focus area 250 of the eye is fairly far left on the HUD, the altitude tape 206 is far from the focus area 205, therefore the viewing and up-taking of the critical altitude information rather difficult. Therefore, providing the pilot with the critical flight reference data in the most useful and intuitive manner at all times, including this scenario, is a technical problem to be solved.

Figure 3:
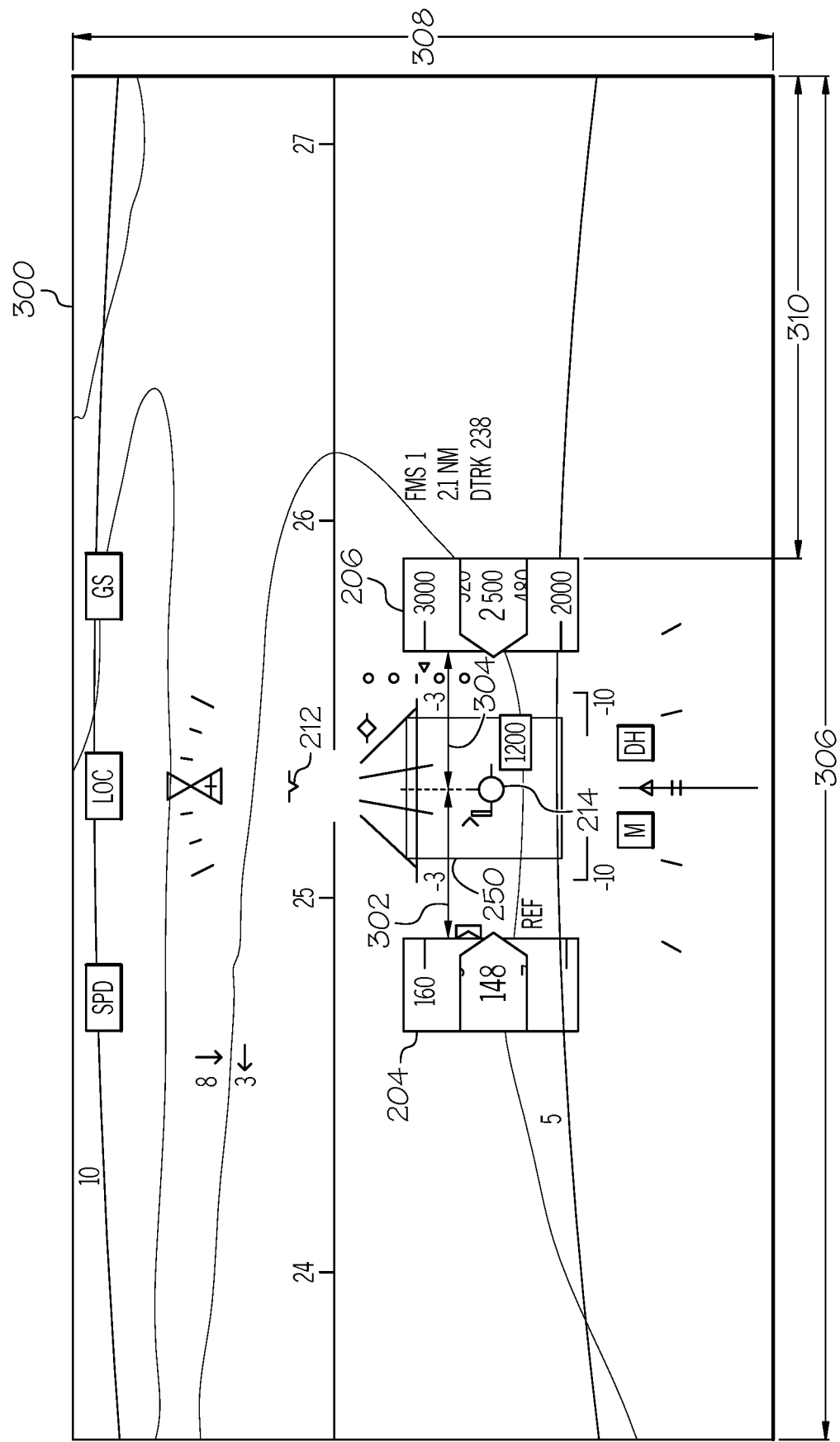
FIG. 3 is an illustration showing critical flight reference data on a HUD, in accordance with an exemplary embodiment.
Figure 4:
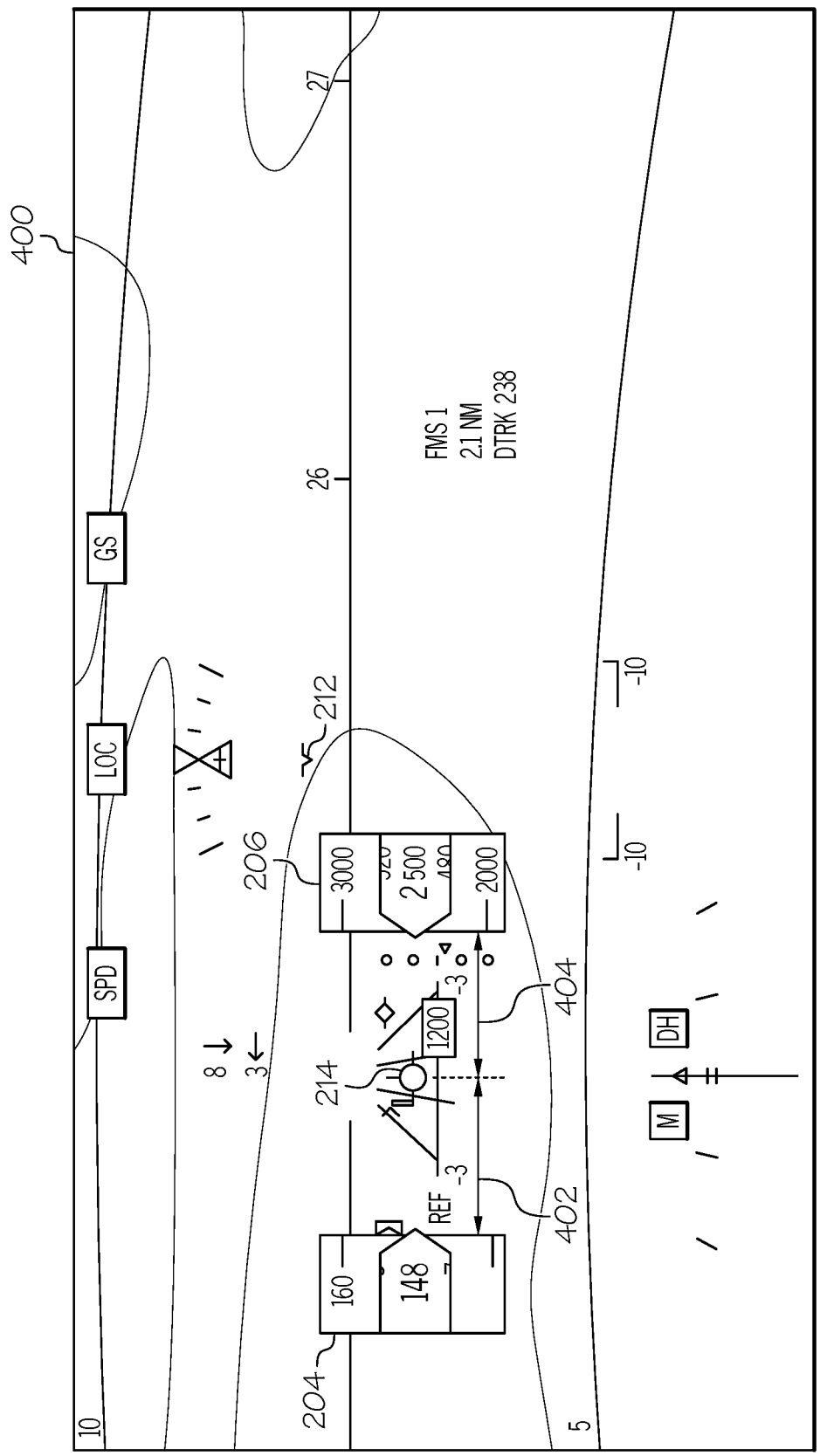
FIG. 4 is another illustration showing critical flight reference data on a HUD, the critical flight reference data being associated with a flight path vector symbol, in accordance with an exemplary embodiment.

The systems and methods provided herein provide a technical solution to this problem by coupling, or associating, critical flight reference data with the symbol for the flight path vector 214. The technological enhancement provided by the system 102 over other flight display systems (such as the one depicted in FIG. 2) is shown and described in connection with FIGS. 3-4. The images of FIGS. 3-4 are understood to be based on current aircraft status data for the aircraft 100 and to be dynamically modified responsive to continuously obtaining and processing the current aircraft status data. The images 300 and 400 may also be continuously updated to reflect real-time changes in external environment with respect to terrain, airport features, weather and neighbor traffic/relevant traffic. The critical flight reference data described herein include airspeed indicators and altitude indicators, each having analog components and digital components. As used herein, a HUD display area, or image area, is taken to be described by the boundary dimensions of the display device 26, or two distances: (X width) distance 306; and (Y height) distance 308.

The provided embodiments generate a first readout arrangement, in which the airspeed indicator, airspeed tape 204 and the altitude indicator, altitude tape 206 are separated and located as follows: the airspeed tape 204 and the altitude tape 206 are (i) each located in relationship to boundary edges of the display device, and (ii) their locations are substantially static. Locating the indicators in relationship to the boundary edges of the display device allows control over a separation distance (separation distance being distance 302 plus distance 304) and fosters maximization of the open screen area between the indicators. Note that the airspeed tape 204 and the altitude tape 206 are each an edge distance 310 from a respective boundary. In some embodiments, the edge distance 310 is about 10% of the width of the HUD.

The area of focus of the eye, focus area 250 is assumed to be the same size and dimension in FIGS. 2-4 (not demarked in FIG. 4). In some embodiments, the first readout arrangement moves the critical flight reference data closer to the center of the image 300, and therefore, closer to the flight path vector 214 than existing display systems, such as shown in FIG. 2. Comparing image 300 to HUD 202, in these embodiments, the airspeed tape 204 is located a shorter distance 302 (shorter than distance 216) from the flight path vector 214, and the altitude tape 206 is located a shorter distance 304 (shorter than distance 218) from the flight path vector 214. In various embodiments, distance 302 and distance 304 are substantially equal and referred to as a first distance. Regardless of the size of distance 302 and distance 304, they are understood to be static in the first arrangement.

The computer system 104 is continually receiving and processing a current heading of the aircraft and comparing that to a current axis of the aircraft to generate therefrom a deviation between the heading of the aircraft (depicted by water line 212) and the flight path vector 214. A configurable deviation threshold is referenced, and when the deviation is greater than or equal to the deviation threshold (referred to herein as "an unacceptable deviation"), the computer system 104 toggles from the first readout arrangement to a second readout arrangement that is dynamic. Additionally, the computer system 104 is configured to toggle from the second readout arrangement back to the first readout arrangement when the detected deviation is less than the deviation threshold.

In toggling from the first readout arrangement to the second readout arrangement, the computer system 104 modifies the first readout arrangement to the second readout arrangement, in which a location of the airspeed indicator, airspeed tape 204, and a location of the altitude indicator, altitude tape 206, are separated and located as follows: the airspeed tape 204 and the altitude tape 206 are (i) each located a distance (402, 404) measured from the flight path vector 214, and (ii) dynamically change location responsive to movement of the flight path vector 214. In the depicted embodiment, the airspeed tape 204 and the altitude tape 206 straddle the flight path vector 214, and distance 402 and distance 404 are equal, and referred to as a second distance. In an embodiment, the first distance is larger than the second distance. In an embodiment, distance 402 is smaller than distance 302 and distance 404 is smaller than distance 304.

As mentioned, the system 102 allows a user to configure the deviation threshold, which is used to trigger changing between the first arrangement of the airspeed indicator and altitude indicator (a static arrangement) and the second arrangement (a dynamic arrangement). As shown in FIG. 4, while operating in the second arrangement, the critical flight reference data is dynamically associated with the flight path vector 214, which means that the critical flight reference data is near to the focus area 250. This may be confirmed by noting that the water line 212, depicting the current heading, is off to the right of the critical flight reference data provided by the altitude tape 206. This is an enhancement over the display system depicted in FIG. 2.

Figure 5:
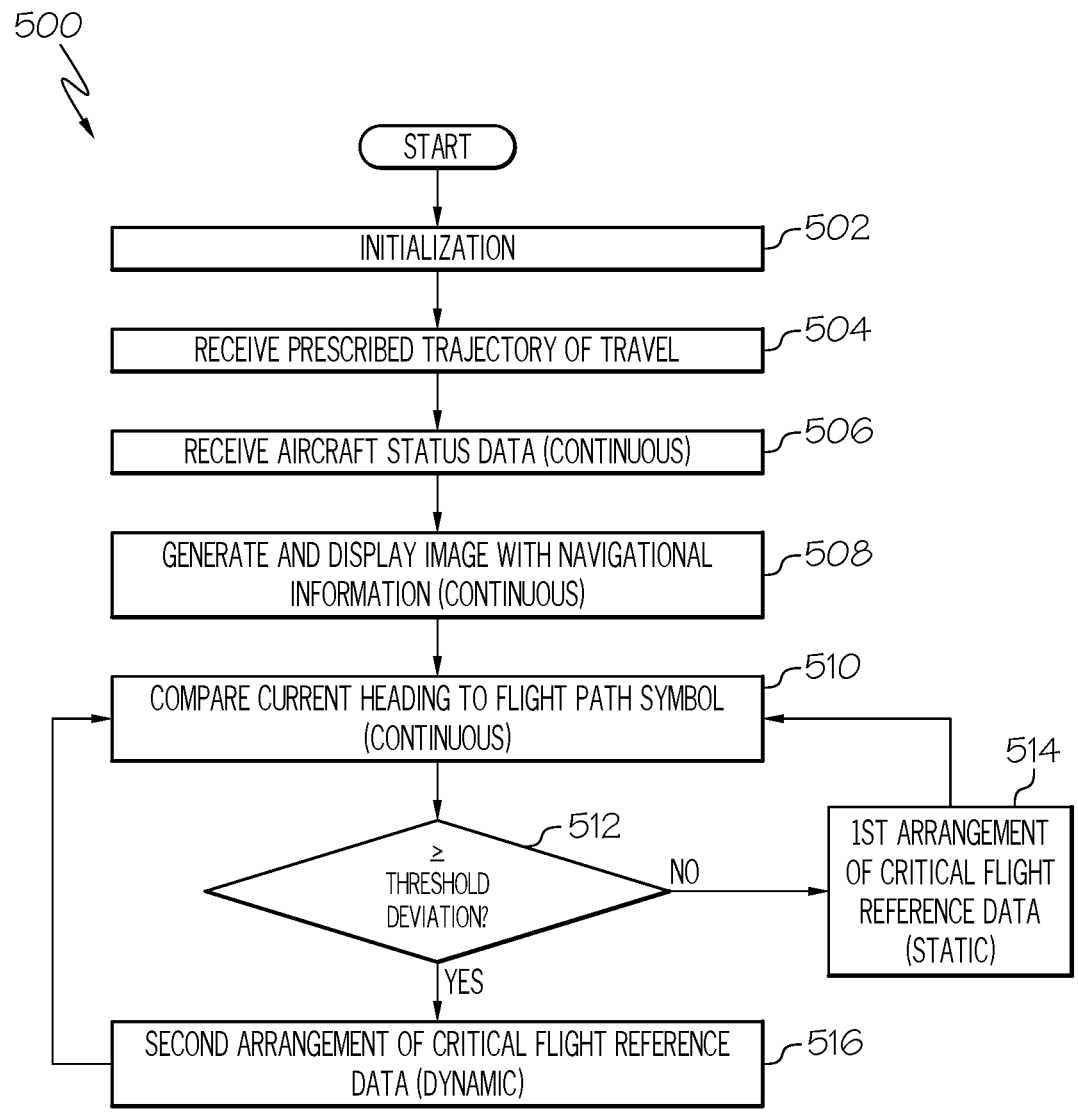
FIG. 5 is a flow chart for a method for associating critical flight reference data with a flight path vector symbol, in accordance with an exemplary embodiment.

Referring now to FIG. 5 and with continued reference to FIGS. 1-4, a flow chart is provided for a method 500 for providing a system 102, in accordance with various exemplary embodiments. Method 500 represents various embodiments of a method for dynamic tapes. For illustrative purposes, the following description of method 500 may refer to elements mentioned above in connection with FIG. 1. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 if the intended overall functionality remains intact.

The method starts, and at 502 the control module 104 is initialized. As mentioned above, initialization may comprise uploading or updating instructions and applications 160, program 162, stored variables 164, and various lookup tables stored in the database 156. Stored variables may include, for example, a configurable delta airspeed, a configurable delta rate-change, predetermined amounts of time to use as time-thresholds, parameters for setting up a user interface, and the various shapes, various colors and/or visually distinguishing techniques used for icons and alerts. In some embodiments, program 162 includes additional instructions and rules for rendering information differently based on type of display device in display system 112. Initialization at 602 may also include identifying external sources 50 and/or external signals and the communication protocols to use with each of them.

At 504, the data representing the prescribed trajectory of travel is received. At 506, aircraft status data is received. During operation, it is understood that aircraft status data is continuously received. At 508, an image 28 is generated and displayed on the display device 26 that depicts navigational information for the aircraft. In an example, the displayed navigational information may include the critical flight reference data overlaid on environmental surroundings of the aircraft, and other aircraft status data, as described above. The displayed image is continuously updated. In various embodiments, the displayed image includes an integration of data from the navigation system 108, the NavDB 110, airport features (120), terrain (120), weather (52), and traffic (54).

At 510 a current heading of the aircraft is compared against sensed data indicating an axis of the aircraft (both are components of the aircraft status data). In practice, this looks like a comparison of the location of the water line 212 to the location of the symbol for the flight path vector 214. This is a continuous comparison, and any detected deviation between the two is measured and compared to the deviation threshold.

At 512, if the detected deviation is less than the deviation threshold, at 514, the display system is commanded to overlay an airspeed indicator, airspeed tape 204, and an altitude indicator, altitude tape 206, in a first readout arrangement (FIG. 3, image 300), in which the airspeed tape 204 and the altitude tape 206 are (i) each located in relationship to boundary edges of the display device, and (ii) their locations are substantially static. In some embodiments, the airspeed indicator is a dial. In some embodiments, the altitude indicator is a dial. From 514, the method 500 returns to 510.

At 512, if the detected deviation is greater than or equal to the deviation threshold, the display system is commanded to modify the first readout arrangement to a second readout arrangement, in which a location of the airspeed indicator and a location of the altitude indicator are (i) each located a distance (402, 404) measured from the flight path vector 214, and (ii) dynamically change location responsive to movement of the flight path vector 214. From 516, the method 500 returns to 510.

In a first embodiment, the first arrangement and the second arrangement each include (i) an analog indicator of the airspeed, (ii) an analog indicator of altitude, (iii) a digital airspeed indicator, and (iv) a digital altitude indicator. In a second embodiment, the first arrangement and the second arrangement each include (i) an analog indicator of the airspeed and (ii) an analog indicator of altitude. In a third embodiment, the first arrangement and the second arrangement each include (i) a digital airspeed indicator and (ii) a digital altitude indicator.

Thus, technologically improved systems and methods for displaying critical flight reference data on a HUD are provided. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display system for an aircraft, comprising:
   a source of aircraft status data that is real-time;
   a source of data representing a trajectory of travel;
   a display system configured to process the aircraft status data and a prescribed trajectory of travel to display on a display device a continuously updated image with a flight path vector; and
   a computer system configured to receive and process the aircraft status data and the data representing the prescribed trajectory of travel to:
   (a) command the display system to overlay a first readout arrangement, in which an airspeed indicator and an altitude indicator (i) are each located in relationship to boundary edges of the display device, each being at least a first distance from the flight path vector, and (ii) have a substantially static location;
   (b) reference a configurable deviation threshold;
   (c) determine, continuously, whether a deviation between a heading of the aircraft and the flight path vector is greater than or equal to the configurable deviation threshold; and
   toggle from the first readout arrangement to a second readout arrangement, in which the airspeed indicator and the altitude indicator (i) straddle the flight path vector, each being located at a second distance from the flight path vector, the second distance being smaller than the first distance, and (ii) have a dynamically changeable location that is responsive to movement of the flight path vector, when the deviation between the heading of the aircraft and direction of travel represented by flight path symbol is greater than or equal to the configurable deviation threshold.

2. The system of claim 1, wherein the computer system is further configured to toggle from the second readout arrangement to the first readout arrangement, when the deviation between the heading of the aircraft and the flight path symbol is less than the configurable deviation threshold.

3. The system of claim 2, wherein, in the first arrangement, the airspeed indicator and the altitude indicator are each equidistant from a waterline symbol.

4. The system of claim 3, wherein, in the first arrangement, the airspeed indicator and the altitude indicator are each equidistant from an image edge.

5. The system of claim 4, wherein the airspeed indicator and the altitude indicator are each a tape.

6. The system of claim 4, wherein the airspeed indicator and the altitude indicator are each a dial.

7. The system of claim 5, wherein, in the second arrangement, the airspeed indicator and the altitude indicator are each equidistant, at the second distance, from the flight path vector.

8. A processor implemented method for a flight display system for an aircraft, comprising:
   receiving aircraft status data;
   receiving data representing a prescribed trajectory of travel;

processing the aircraft status data and the data representing the prescribed trajectory of travel to display on a display device a continuously updated image with a flight path vector depicting an axis of the aircraft at a current location of the aircraft;

commanding the display system to overlay a first readout arrangement, in which an airspeed indicator and an altitude indicator are (i) each located in relationship to boundary edges of the display device, each being at least a first distance from the flight path vector, and (ii) have a substantially static location;

referencing a configurable deviation threshold;

determining, continuously, whether a deviation between a heading of the aircraft and the flight path symbol is greater than or equal to the configurable deviation threshold; and toggling from the first readout arrangement to a second readout arrangement, in which the airspeed indicator and the altitude indicator (i) straddle the flight path vector, each being located at a second distance from the flight path vector, the second distance being smaller than the first distance, and (ii) have a dynamically changeable location that is responsive to movement of the flight path vector, when the deviation between the heading of the aircraft and direction of travel represented by flight path symbol is greater than or equal to the configurable deviation threshold.

9. The method of claim 8, further comprising: subsequent to displaying the second readout arrangement, determining that the deviation between the heading of the aircraft and the flight path symbol is less than the configurable deviation threshold; and commanding the display system to toggle the second readout arrangement to the first readout arrangement responsive thereto.

10. The method of claim 9, wherein, in the first arrangement, the airspeed indicator and the altitude indicator are each equidistant from a waterline symbol.

11. The method of claim 10, wherein, in the first arrangement, the airspeed indicator and the altitude indicator are each equidistant from an image edge.

12. The method of claim 11, wherein the airspeed indicator and the altitude indicator are each a tape.

13. The method of claim 11, wherein the airspeed indicator and the altitude indicator are each a dial.

14. The method of claim 12, wherein, in the second arrangement, the airspeed indicator and the altitude indicator are each equidistant from the flight path vector.

15. An aircraft, comprising:

a source of aircraft status data;

a source of data representing a prescribed trajectory of travel;

a display system configured to receive and process the aircraft status data and the data representing the prescribed trajectory of travel to display a continuously updated image with a symbol for a flight path vector depicting an axis of the aircraft at a current location of the aircraft; and a computer system coupled to the display system and configured to receive and process aircraft status data and the data representing the prescribed trajectory of travel to:

(a) command the display system to overlay a first readout arrangement, in which a location of an airspeed indicator and a location of an altitude indicator are each substantially static, and at least a first distance from the flight path vector;

(b) determine whether a deviation between a heading of the aircraft and the flight path vector is greater than or equal to a configurable deviation threshold; and when the deviation between the heading of the aircraft and the flight path symbol is greater than or equal to the threshold, command the display system to toggle the first readout arrangement to a second readout arrangement, in which the airspeed indicator and the altitude indicator (i) straddle from the flight path vector, each being located at a second distance from the flight path vector, the second distance being smaller than the first distance, and (ii) have a dynamically changeable location that is responsive to movement of the flight path vector.

16. The aircraft of claim 15, wherein the computer system is further configured to: subsequent to displaying the second readout arrangement, toggle the second readout arrangement to the first readout arrangement, when the deviation between the heading of the aircraft and the flight path symbol is less than the configurable deviation threshold.

17. The aircraft of claim 16, wherein, in the first arrangement, the airspeed indicator and the altitude indicator are each equidistant from a waterline symbol.

18. The aircraft of claim 17, wherein, in the first arrangement, the airspeed indicator and the altitude indicator are each equidistant from an image edge.

19. The aircraft of claim 18, wherein the airspeed indicator and the altitude indicator are each a tape.

20. The aircraft of claim 19, wherein, in the second arrangement, the airspeed indicator and the altitude indicator are each equidistant, at a second distance, from the flight path vector.

* * * * *